H. E. GEISS.
Grain Separator.
No. 198,975. Patented Jan. 8, 1878.
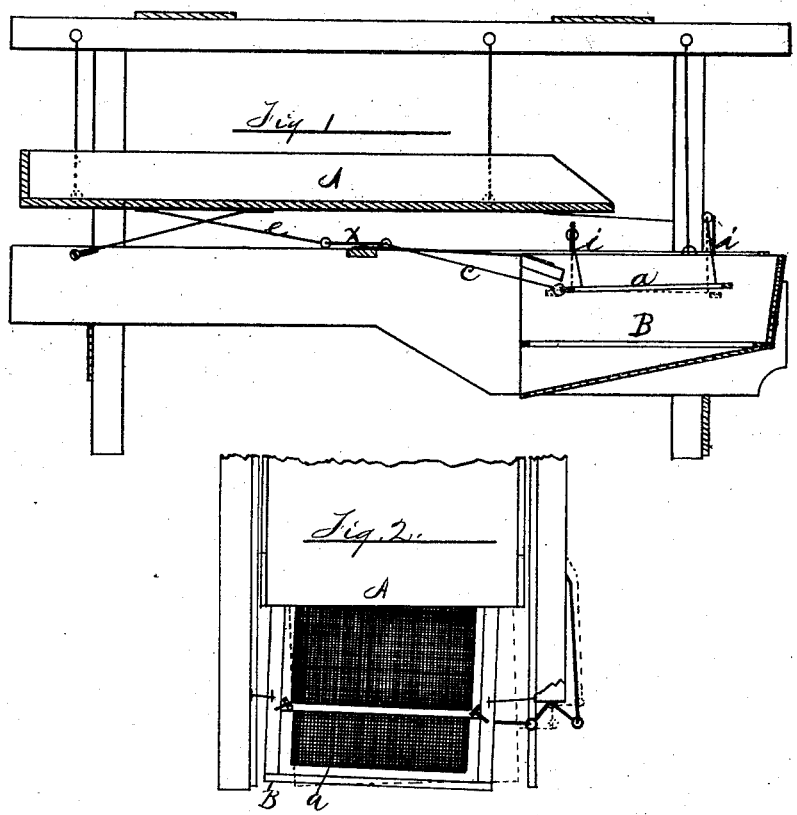
Witnesses
Thos H Hutchins
Wm J Hutchins
Inventor
Hiram E. Geiss

UNITED STATES PATENT OFFICE.

HIRAM E. GEISS, OF FLORENCE, ILLINOIS.

IMPROVEMENT IN GRAIN-SEPARATORS.

Specification forming part of Letters Patent No. 198,975, dated January 8, 1878; application filed October 16, 1877.

*To all whom it may concern:*

Be it known that I, HIRAM E. GEISS, of Florence, in Will county, and State of Illinois, have invented certain Improvements in Sieves or Screens for Thrashing-Machines, Fanning-Mills, &c., the construction and operation of which I will proceed to explain, reference being had to the annexed drawings, in which—

Figure 1 is a longitudinal sectional view, and Fig. 2 a plan view.

The nature of my invention consists in the manner of operating the sieve, so that it will not clog or choke while in operation, by means of giving it an end shake independent of the shake or motion of the shoe in which it operates.

In the drawings, B represents the shoe of the machine, having the ordinary side shake given to it by means of the ordinary device, as shown. The shoe B contains the sieve *a*, hung at its corners or sides by rods *i*, so arranged as to swing the sieve endwise while being shaken sidewise with the shoe B.

It will be observed that the sieve *a* has two motions at the same time. The end shake to the sieve *a* is given to it by means of the rods *c e* and lever *x*, attached to the reciprocating shaker A above. However, this end shake to the sieve *a* may be imparted to it by means of any device substantially the same.

The end shake to the sieve *a* wholly prevents any clogging of the sieve by wet grain or heads of grain. For, when the side shake of the shoe is depended on wholly, the inner end of the sieve gets comparatively no motion whatever, and allows clogging, which is entirely obviated by the end shake of the sieve *a*, as set forth. This end shake is a sort of swinging, pitching motion, instead of a tossing motion, whereby the grain is carried forward rather by a sliding motion on the sieve than by a toss, so that the sticks and chaff will not come down endwise, as if tossed up to fall on the sieve and stick in the meshes.

Having thus described my invention, what I claim as new, and desire to secure by Letters Patent, is as follows:

1. The combination and arrangement of the shaking-shoe B with the swinging sieve *a*, hung at its corners by the rods *i*, to swing endwise independently of the shoe B, in the manner and for the purpose set forth.

2. The sieve *a*, having a swinging, pitching motion imparted to it by means of the rods *c, e*, and *i*, lever *x*, and swinging carrier A, when arranged to swing in the shoe B, in the manner and for the purposes set forth.

HIRAM E. GEISS.

Witnesses:
THOS. H. HUTCHINS,
WM. J. HUTCHINS.